Figure 1:
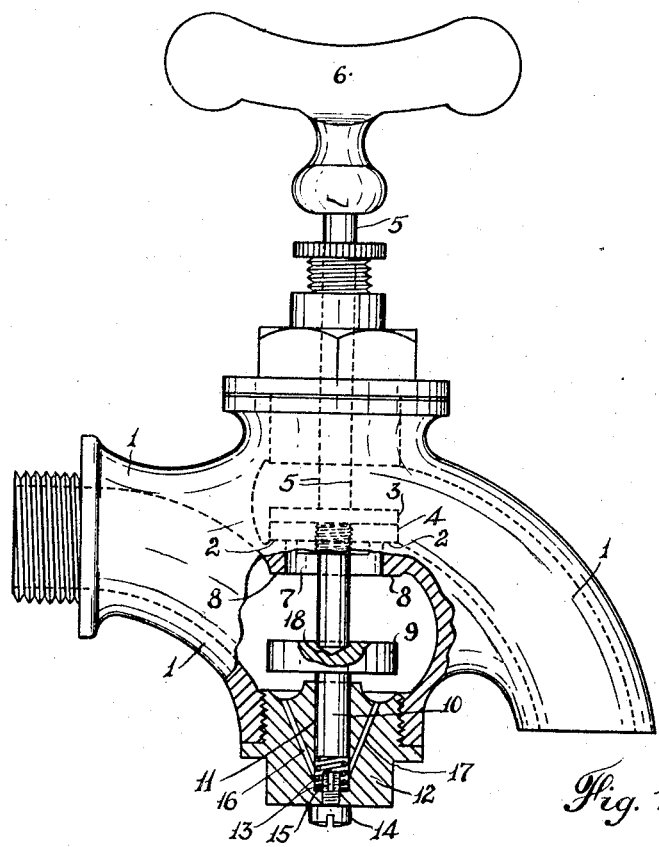

Nov. 10, 1931.  J. HAMILTON ET AL  1,831,414
TAP, COCK, AND THE LIKE
Filed Jan. 2, 1930

Witness:
Arthur Thompson

Inventors:
James Hamilton
John Hynd

Patented Nov. 10, 1931

1,831,414

UNITED STATES PATENT OFFICE

JAMES HAMILTON AND JOHN HYND, OF JOHANNESBURG, TRANSVAAL, SOUTH AFRICA

TAP, COCK, AND THE LIKE

Application filed January 2, 1930, Serial No. 418,125, and in the Union of South Africa March 7, 1929.

This invention has reference to taps, cocks, valves and the like, and is applicable to taps, et cetera, used for fluids under appreciable pressure, including water, air, gas, et cetera.

The object with which the invention is designed is to construct a simple, effective and inexpensive tap or the like which, when the necessary parts are removed in order to renew the washer, or renew or repair any other part, will cause or allow an auxiliary or check valve automatically to close the tap, et cetera, and so prevent the escape and wastage of fluid from the supply pipe to which the tap or the like is fitted.

According to the present invention the body or main part of the tap, et cetera, which, as usual, forms the housing and provides the seating for the ordinary or main valve, is also constructed to provide a housing and seating for an auxiliary or check valve, which is so arranged that, in the event of the main valve being removed from the body, the auxiliary or check valve automatically closes the tap, et cetera, under the influence of the pressure of the fluid which is normally under the control of the main valve. The auxiliary valve is arranged on the pressure side of the main valve and is controlled, directly or indirectly, by the means actuating the main valve, and acts to close the tap by co-operating with a seating provided in the body on the pressure side of the main valve. The body is constructed to provide a guideway for the auxiliary valve stem and a passage to admit the fluid under pressure to the inner end of the guideway beyond the auxiliary valve stem. Means is fitted into the body below the stem for opening a passage for cleaning out and inspection purposes while the tap is under pressure, which means may be in the form of a screw having flats which allow it to be placed in such a position as to provide passages for the escape of dirt.

The invention will be more fully explained with the aid of the accompanying sheet of drawings, wherein two embodiments of the same are shown. In the drawings, Fig. 1 is a part-sectional elevation of a tap embodying the invention in one form, and Fig. 2 is a part-sectional elevation illustrating the application of the invention to a valve.

Figure 2:
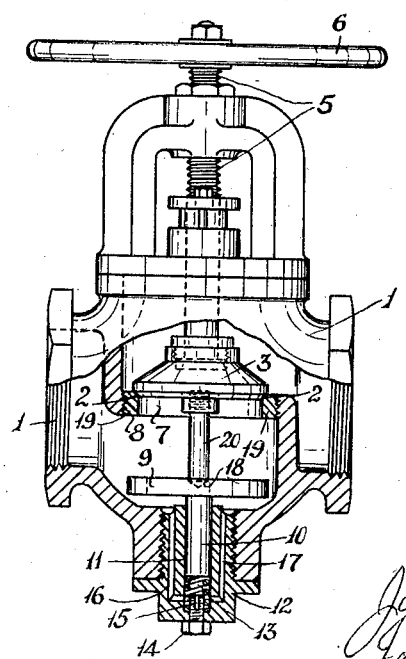

Referring more particularly to Fig. 1 of the drawings, the invention is shown incorporated in a tap of the domestic or similar type. 1 denotes the body of the tap, which forms the housing for the ordinary or main valve and is constructed interiorly to provide an annular seating 2—shown constructed integral with the tap body 1—for said main valve. The main valve comprises the disc 3 and washer 4, operated by a spindle 5 through a handle 6. 7 is the passage for the fluid through the part which provides the main valve seating 2.

The valve spindle 5, or an extension thereof, extends through the main valve 3, 4, and through the passage 7, into the portion of the body which forms the housing for the auxiliary valve. An annular seating 8 for the auxiliary valve 9 is formed around the passage 7.

The auxiliary or check valve 9 includes a disc having a stem or spindle 10, which projects into a recess 11 in a nut or screwed cap 12 screwed into the body 1. The recess 11 forms a guideway for the spindle 10, and in the bottom of the recess 11, below the inner end of the spindle 10 there is arranged a helical spring 13. 14 is a screw which closes the inner end of the recess 11 and provides for access to the bottom of the recess 11 for cleaning out, inspection and other purposes. The screw 14 may be provided with a flat or flats 15 to allow of the escape of dirt from the bottom of the recess 11 without completely removing the screw 14. 16, 17, are two holes formed in the nut or cap 12, which allow the pressure fluid to pass into the recess 11 below the inner end of the stem 10. With the auxiliary valve 9 in the inoperative position the lower end of the extension of the spindle 5 enters a recess 18 in the top of the auxiliary valve 9.

In the drawings the main valve comprising the parts 3, 4, is shown on the seating 2 and closing the tap. In this position the auxiliary valve 9 is forced down and the spring 13 placed in compression.

In the normal operation the main valve 3, 4, is opened by raising it off its seating 2 and allowing the fluid to flow freely through the tap. The auxiliary valve 9 is kept off its seating 8 by the extension of the spindle 5 so that it does not impede the flow of the fluid through the tap. When it is desired to remove the main valve 3, 4, or any of the parts operating it, the spindle 5 and the attached main valve 3, 4, are removed bodily from the tap body 1. During the removal of the main valve 3, 4, the spring 13 forces the auxiliary valve 9 upwards and keeps it in contact with the lower end of the extension of spindle 5 until the pressure fluid acting on the auxiliary valve 9 pushes it tightly on to its seating 8 and so closes the tap at the pressure side.

As the pressure fluid acts through the holes 16, 17, on the underside of the stem 10, and also on the underside of the auxiliary valve 9, the pressure in an upward direction is greater than that in a downward direction, as the downward pressure is exerted only on the top of the auxiliary valve 9 around the extension of the spindle 5.

Although it is preferred to use the spring 13, it may, if desired, be dispensed with and the auxiliary valve 9 be operated solely by the fluid pressure due to the difference in areas.

When the main valve 3, 4, and its operating parts are replaced, the extension of the spindle 5 engages the top of the auxiliary valve 9 and forces it off its seating 8.

It will be apparent that not only will the auxiliary valve 9 serve as a means for closing the tap when the main valve is removed for renewal of the washer 4, or renewal or repair of other parts, but that it will also serve (preferably temporarily) through the medium of the main valve operating means, to control the flow of the fluid through the tap when the main valve is disorganized.

In Fig. 2, illustrating the application of the invention to a valve, the bevelled seating 2 for the main valve, and the seating 8 for the auxiliary valve 9, are provided on a renewable ring 19 screwed into the valve body 1. A pin 20, which is screwed in the underside of the main valve, serves for controlling the movement of the auxiliary valve 9 instead of the extension of the spindle 5. The details of construction of the nut or screwed cap 12 are substantially the same as those described in connection with Fig. 1, and the same numerals of reference denote the same or corresponding details thereof.

What we claim as our invention and desire to protect by Letters Patent is:—

1. A tap or the like, comprising, in combination, a body portion, a main valve housed therein, operating means for said main valve, an auxiliary valve housed in the body on the pressure side of the main valve and having a stem, the body being constructed to provide a guideway for the auxiliary valve stem and a passage to admit the fluid under pressure to the inner end of the guideway beyond the auxiliary valve stem, means fitted into the body below the stem for opening a passage for cleaning out and inspection purposes while the tap is under pressure, and means for controlling the auxiliary valve from the operating means of the main valve so that the fluid pressure acting on the auxiliary valve automatically closes the tap when the main valve and its operating means are removed, as set forth.

2. A tap or the like, comprising, in combination, a body portion, a main valve housed therein, operating means for said main valve, an auxiliary valve housed in the body on the pressure side of the main valve and having a stem, the body being constructed to provide a guideway for the auxiliary valve stem and a passage to admit the fluid under pressure to the inner end of the guideway beyond the auxiliary valve stem, means fitted into the body below the stem for opening a passage for cleaning out and inspection purposes while the tap is under pressure, said latter means being in the form of a screw having flats which allow it to be placed in such a position as to provide passages for the escape of dirt, and means for controlling the auxiliary valve from the operating means of the main valve so that the fluid pressure acting on the auxiliary valve automatically closes the tap when the main valve and its operating means are removed, as set forth.

In testimony whereof we have signed our names to this specification.

JAMES HAMILTON.
JOHN HYND.